US006941388B1

(12) United States Patent
Doraiswami

(10) Patent No.: US 6,941,388 B1
(45) Date of Patent: Sep. 6, 2005

(54) METHOD AND APPARATUS FOR HANDLING CONNECTIONS IN HOT STANDBY LINE CARDS

(75) Inventor: Vijayaraghavan Doraiswami, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 573 days.

(21) Appl. No.: 09/746,706

(22) Filed: Dec. 22, 2000

(51) Int. Cl.[7] .................................................. G06F 3/00
(52) U.S. Cl. .............................. 710/8; 710/17; 710/19; 370/216; 370/217; 370/228
(58) Field of Search ................................ 710/8, 17, 19; 370/216, 217, 228

(56) References Cited

U.S. PATENT DOCUMENTS

| 5,093,824 A | * | 3/1992 | Coan et al. .................. 370/228 |
| 5,138,614 A | * | 8/1992 | Baumgartner et al. ....... 370/261 |
| 5,426,773 A | * | 6/1995 | Chabanet et al. .............. 714/4 |
| 5,621,721 A | * | 4/1997 | Vatuone ....................... 370/394 |
| 5,748,632 A |   | 5/1998 | Honda et al. |
| 5,848,055 A | * | 12/1998 | Fedyk et al. ................. 370/228 |
| 5,959,972 A | * | 9/1999 | Hamami ...................... 370/228 |
| 6,278,688 B1 | * | 8/2001 | Suutari et al. ............... 370/217 |
| 6,311,288 B1 | * | 10/2001 | Heeren et al. .................. 714/4 |
| 6,324,590 B1 |   | 11/2001 | Jeffords et al. |
| 6,370,232 B1 | * | 4/2002 | Yrjana ......................... 379/37 |
| 6,408,163 B1 |   | 6/2002 | Fik |
| 6,483,850 B1 |   | 11/2002 | Chui et al. |
| 6,496,475 B1 | * | 12/2002 | Ji et al. ....................... 370/216 |
| 6,512,769 B1 | * | 1/2003 | Chui et al. ................... 370/232 |
| 6,580,689 B1 | * | 6/2003 | Nagai et al. ................. 370/227 |
| 6,633,563 B1 | * | 10/2003 | Lin et al. ..................... 370/389 |

* cited by examiner

Primary Examiner—Jeffrey A. Gaffin
Assistant Examiner—Niketa Patel
(74) Attorney, Agent, or Firm—Blakely, Sokoloff, Taylor & Zafman LLP

(57) ABSTRACT

A standby card is powered after an active card. A connection command is received by the standby card from the active card. The connection command is associated with a logical connection number (LCN) for a connection. The LCN is used as a first index to a location in a first memory area to retrieve a second index to a location in a second memory area. The second index is used to access the connection from the location in the second memory area.

32 Claims, 13 Drawing Sheets

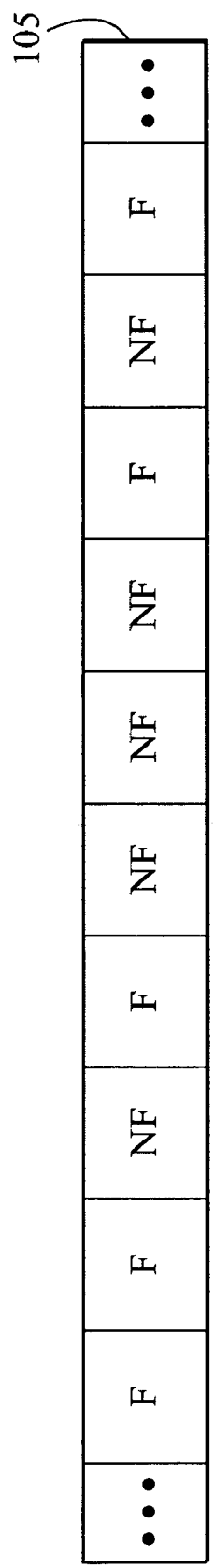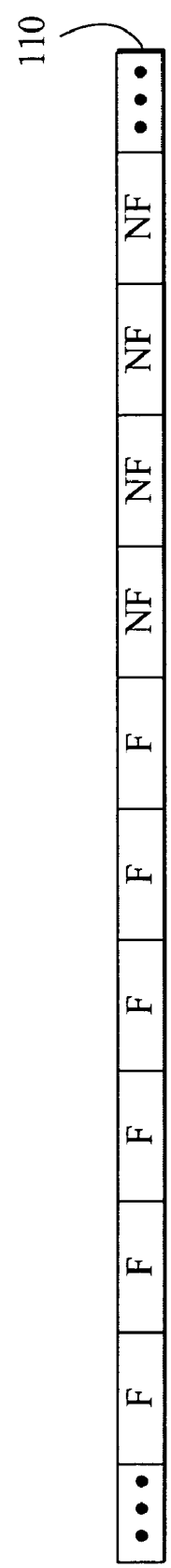

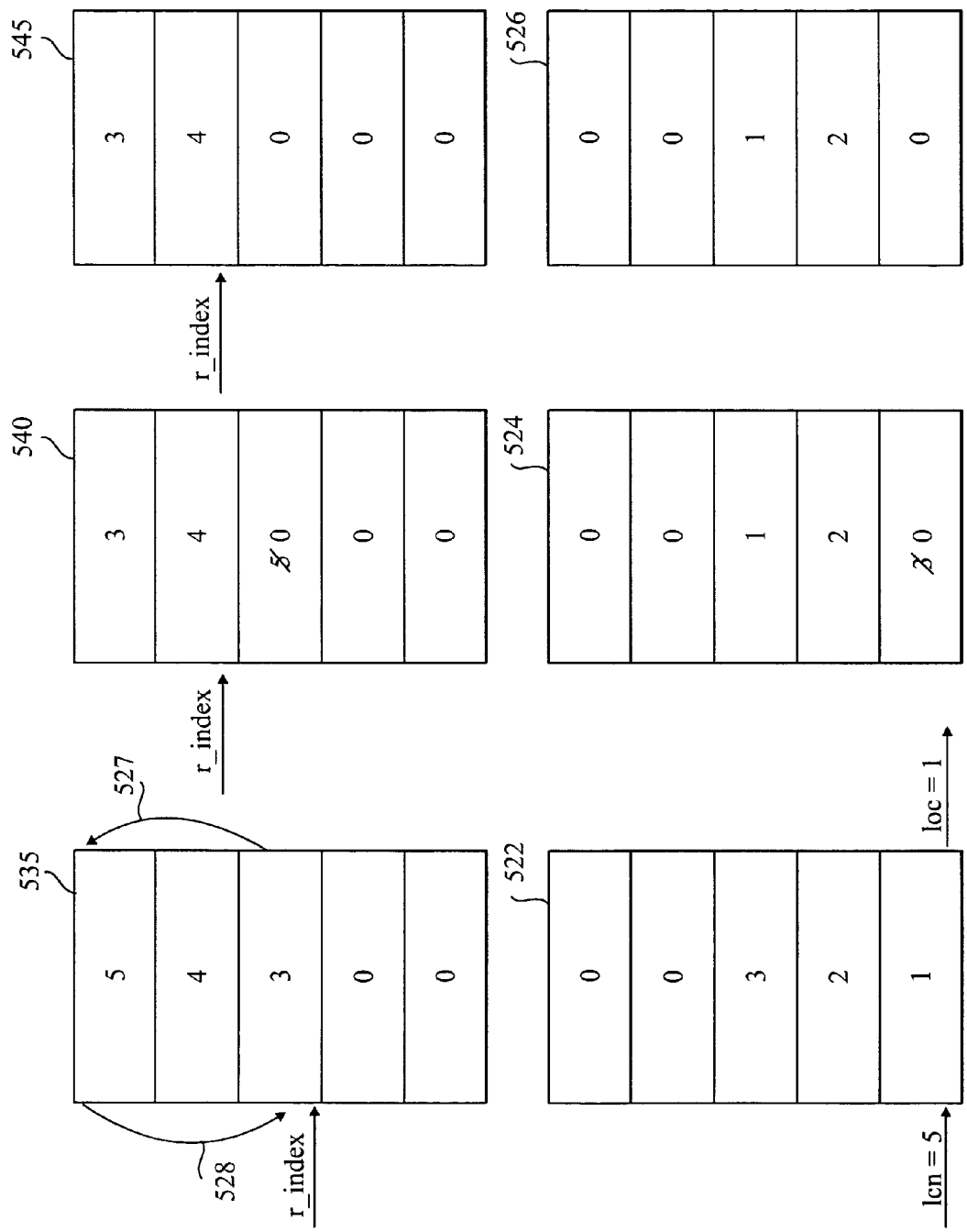

METHOD AND APPARATUS FOR HANDLING CONNECTIONS IN HOT STANDBY LINE CARDS

FIELD OF THE INVENTION

The present invention relates generally to field of network communication. More specifically, the present invention is directed to a method and a system for handling connection reference in hot standby line card situations.

BACKGROUND

Redundancy is generally used in order to minimize network down time. This may be in the form of a backup link when a primary link fails. It may also be in the form of a back up link card (e.g., line interface card) when a primary link card fails. This is referred to as card redundancy. In a one-to-one card redundancy, every card has a corresponding redundant card. One card acts as an active card and the other card acts as a standby card. The standby card may be a hot standby card. The hot standby card is powered and ready to take the role of the active card, if the existing active card fails.

The standby card is generally synchronized with the active card. Synchronization can take place continuously while the active card is still functional. For example, the active card may receive multiple add connection and delete connection commands and transfer these commands to the standby card. These connection commands are serviced by the active card using a pool of connection resources on the active card. These connection resources are referred to as LCN (logical channel number or logical connection number) resources. Similarly, these commands need to be replayed on the standby card in order to synchronize the standby card with the active card.

The standby card may be in sync with the active card if the standby card and the active card were powered on at a same time because the standby card would have received continuous updates sent from the active card. Alternatively, the standby card may be in sync with the active card if the standby card is powered on at a subsequent time from when the active card was powered on and if the active card does not have any connections.

However, when the active card already has multiple connections and the standby card is subsequently powered on, the standby card connection information is not the same as the connection information in the active card. This is because the LCN pool on the standby card is full (free) upon initialization. Since there is no history of events that occurred on the active card, the standby card cannot recreate the events in order to synchronize its LCN resources with the LCN resources on the active card. The active card can only transfer current state or the existing state to the standby card. This situation can lead to sparse array or 'holes' in the LCN pool of the standby card.

The standby card changes role from a standby role to an active role when the active card fails. Typically, when the active card fails, new connection provisioning, modification or deletion commands are lost and traffic loss occurs. Delay in the role change of the standby card from its standby role to the active role directly affects the amount of traffic loss.

SUMMARY OF THE INVENTION

In one embodiment of the present invention, a method for minimizing delay time to allow a standby card to change role from a standby role to an active role is disclosed. A logical connection number (LCN) associated with a connection is received from a connection command on the standby card from the active card. The LCN is used as a first index to a location in a first memory area to retrieve a second index to a location in a second memory area. The second index is used to access the connection from the location in the second memory area.

Other objects, features and advantages of the present invention will be apparent from the accompanying drawings and from the detailed description, which follows.

BRIEF DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

FIG. 1A is an exemplary illustration of a non-compacted array of LCN resources.

FIG. 1B is an exemplary illustration of a compacted array of LCN resources.

FIGS. 5A–5H are exemplary block diagrams illustrating the freelist and the scratch pad using a sequence of exemplary add connection and delete connection commands.

DETAILED DESCRIPTION

Figure 1C:
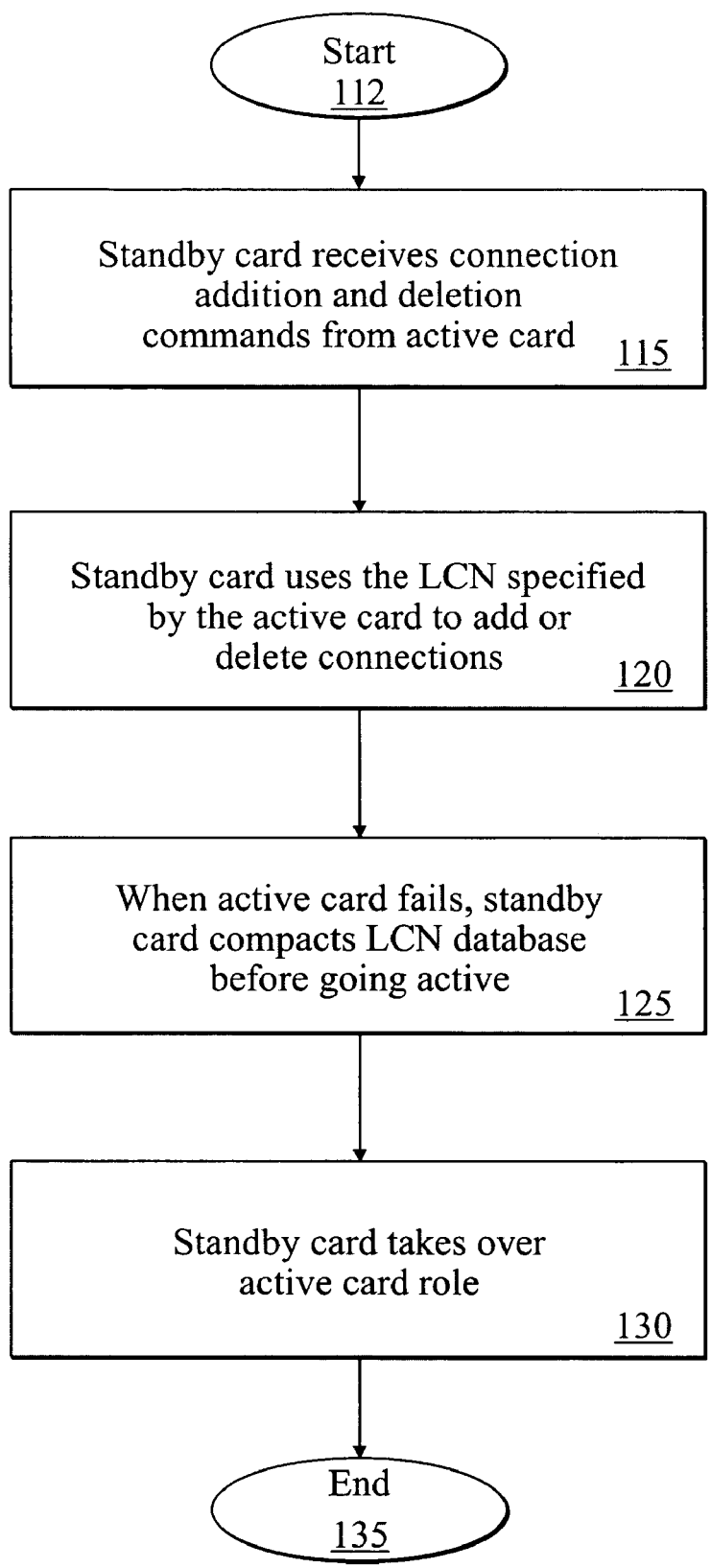
FIG. 1C is an exemplary flow diagram of a typical role change process.

In one embodiment of the present invention, a method for minimizing delay time to allow a standby card to change role from a standby role to an active role is disclosed. The standby card is powered after multiple events (e.g., connection commands) have occurred in the active card. The standby card updates its logical channel number or logical connection number (LCN) database for each event received from the active card after the standby card is powered. The LCN database is compacted by the standby card such that when the role change takes place, delay due to LCN database compaction is reduced to zero.

In the following description, the term LCN database may be used interchangeably with LCN resources, LCN pool or freelist. The term allocate connection may be used interchangeably with add connection. The term deallocation connection may be used interchangeably with delete connection. The LCN database can be large (e.g., 128K entires) to support a large number of connections. The active card adds and deletes connections based on multiple LCN add and delete connection commands or events. For example, let "L" represent the sample space of all the LCNs that are available initially on the both the active card and the standby card, then:

$L = \{L_1, L_2, L_3, L_4, \ldots L_i, L_{i+1} \ldots L_n\}$.

Let "S" represents the sample space of all the events, then $S = \{E_1, E_2, E_3, E_4, \ldots E_i, E_{i+1}, \ldots E_n\}$.

where an event in the sample space S is either one of the two events, Add (A) or Delete (D) connection. Initially, a set of events has already occurred in the active card when the standby card is inserted at a time 't' (i.e., powered and becomes a hot standby). Let "$S_p$" be this set of events, then $S_p = \{E_1, E_2, E_3, \ldots E_i\}$, where $S_p$ is a subset of S.

Let L' be an array of "available" LCNs on the active card or on the standby card, then:
$L' = \{L_1, L_2, L_3, L_4, L_5, L_6, \ldots L_n\}$ The array of available LCNs in the active card or in the standby card can be considered a freelist for allocating LCNs. The freelist of LCNs is maintained in the array for better connection addition performance.

Typically, when the standby card is inserted after the active card has been operational, the active card transfers add command for existing connections and only the transactions or events pertaining to new connection commands to the standby card. This includes transferring the LCN number associated with each connection command. The standby card uses the same LCN number and performs the add connection or the delete connection operations. Note that the LCN array on the standby card is initially full since the standby card has no history of events occurring in the active card prior to being inserted. This situation can lead to holes in the array. This array is also referred to as sparse array. Let L" be the sparse array, then:
$L'' = (L_1, L_2, 0, 0, L_5, L_6 \ldots L_n)$ where "0" indicates a hole in the array. When the standby card changes its role from standby to active, performance of connection addition will be affected. The method of the present invention provides a mechanism to have a compact array (and not a sparse array) after processing an add or delete command operation on the LCN database. With this method, an explicit array compaction operation is not required and hence time is saved when the role of the standby card is changed from standby to active.

FIG. 1A is an exemplary illustration of a pool of LCN resources in a form of an array. The array 105 may reflect a current state of the pool of LCN resources in a standby card before a compaction operation is performed. "F" represents available or free LCN. "NF" represents non-available or non-free LCN. The non-free LCNs may be viewed as holes in the array 105. The array 105 is referred to as a sparse array because of the holes created by the non-free LCNs. With the sparse array, it may take longer to locate a free LCN to process an add or allocation connection command. When there are a lot of connections (e.g., 128K LCN pool), it takes longer time to search. Typically, an array compaction operation is performed when the standby card changes role to an active card. FIG. 1B is an exemplary illustration of a compacted array. Note that the free LCNs are located at the left end of the compacted array 110 and the non-free LCNs are locacated at the right end of the compacted array 110.

FIG. 1C is an exemplary flow diagram of a typical role change process. The process does not employ the method of the present invention. The process starts at block 112. The active card processes each add connection and delete connection command received and updates its free list of LCN resources (e.g., LCN database) accordingly. In addition, the active card communicates each allocation connection and deallocation connection command to the standby card to allow the standby card to synchronize its free list of LCN resources (e.g., LCN database). The standby card receives random add and delete connection commands from the corresponding active card, as shown in block 115. With each add connection or delete connection commnand, a LCN number is provided by the active card. The standby card uses the LCN number to perform the add connection or delete connection commands, as shown in block 120. As discussed earlier, over time the standby card LCN database may be viewed as a sparse array. When the active card fails, one of the operations performed by the standby card before going active is compacting the LCN database to eliminate the sparse array situation, as shown in block 125. At block 130, the standby card takes over the operation of the active card. The process ends at block 135.

Figure 2:
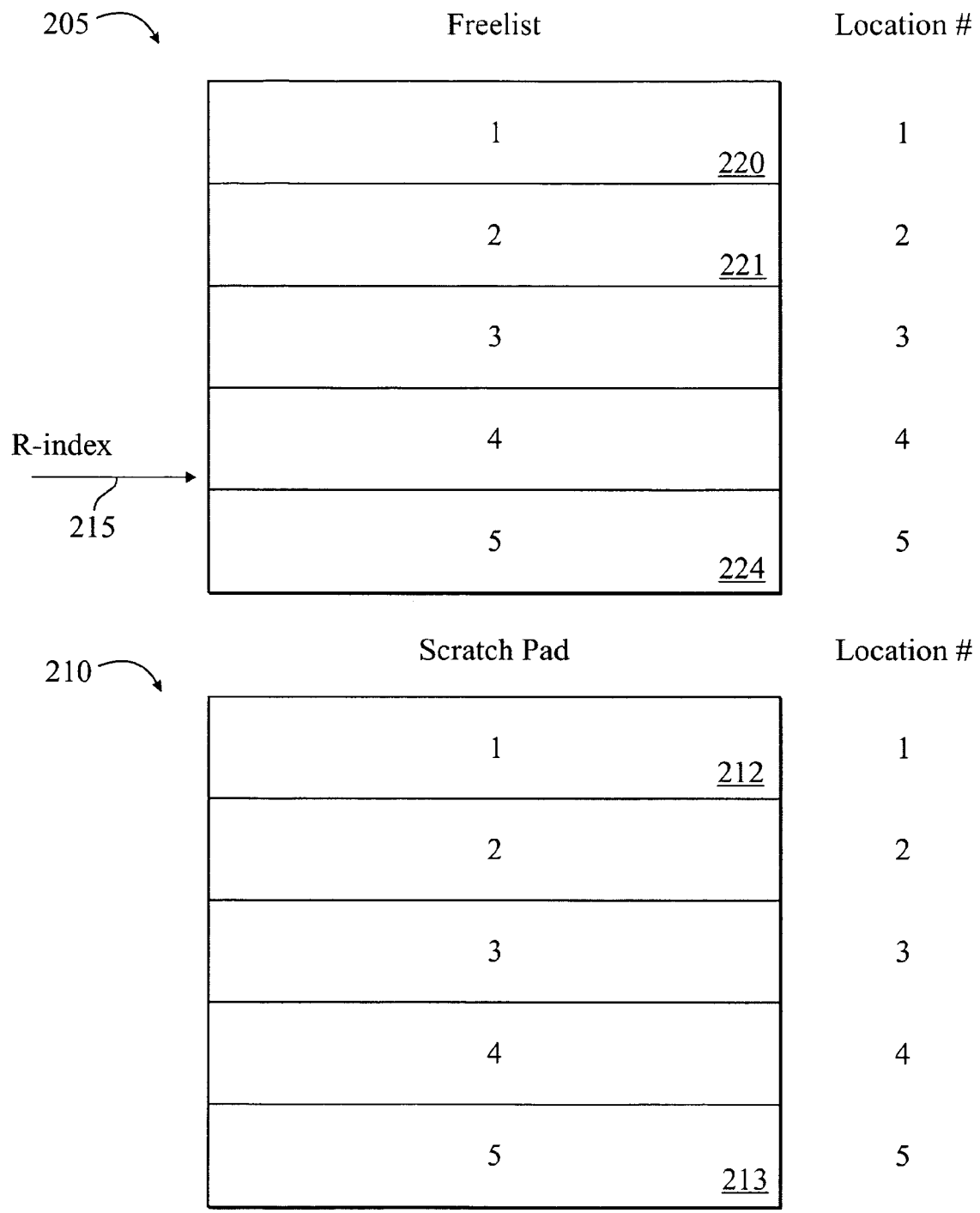
FIG. 2 is an exemplary block diagram illustrating the LCN resources in the standby card.

In one embodiment, the array compaction operation is performed by the standby card while being in the standby role. When the standby card changes role, the array is already compacted. This allows the role change process to avoid the delay due to the array compaction. FIG. 2 is an exemplary block diagram illustrating the LCN resources in the standby card. The LCN resources may be stored in a block of memory on the standby card. In this example, the maximum number of LCN resources is five (5), and the LCN resources are represented in an array or a freelist 205. Another block of memory on the standby card may be used as a scratch pad or array 210 to help with the arrangement of the LCNs in the freelist 205. The scratch pad 210 contains locations of the LCNs in the free list 205 and is used to hold the "swapped" locations of the allocated and the yet to be allocated LCNs. These locations are the index locations into the freelist 205. A running index 215 ("r_index") or pointer is used to point into the freelist 205. A flag may be set to indicate when the freelist is empty (i.e., no available LCN resources) and another flag may be set to indicate when the freelist is full. Each freelist location and scratch pad location in this example is identified by a location number having a value from 1 to 5, as illustrated in FIG. 2.

The freelist 205 contains free LCNs. Initially, the freelist is full. For example, the first location 220 of the freelist 205 has a value of 1 for LCN 1. The second location 221 has a value of 2 for LCN 2, and the fifth location 224 has a value of 5 for LCN 5, etc. The r_index 215 is initially set to point to the last index or to the bottom of the freelist 205. Initially, the r_index 215 has a value equal to the maximum number of LCNs. In this example, r_index 215 has a value of 5, and the LCN 5 can be retrieved from the freelist 205 using the r_index value of 5. The LCN resources in the standby card is updated using the add and delete connection information communicated by the active card. The add and the delete connection information correspond to the add and delete connection commands received by the active card.

Figure 3:
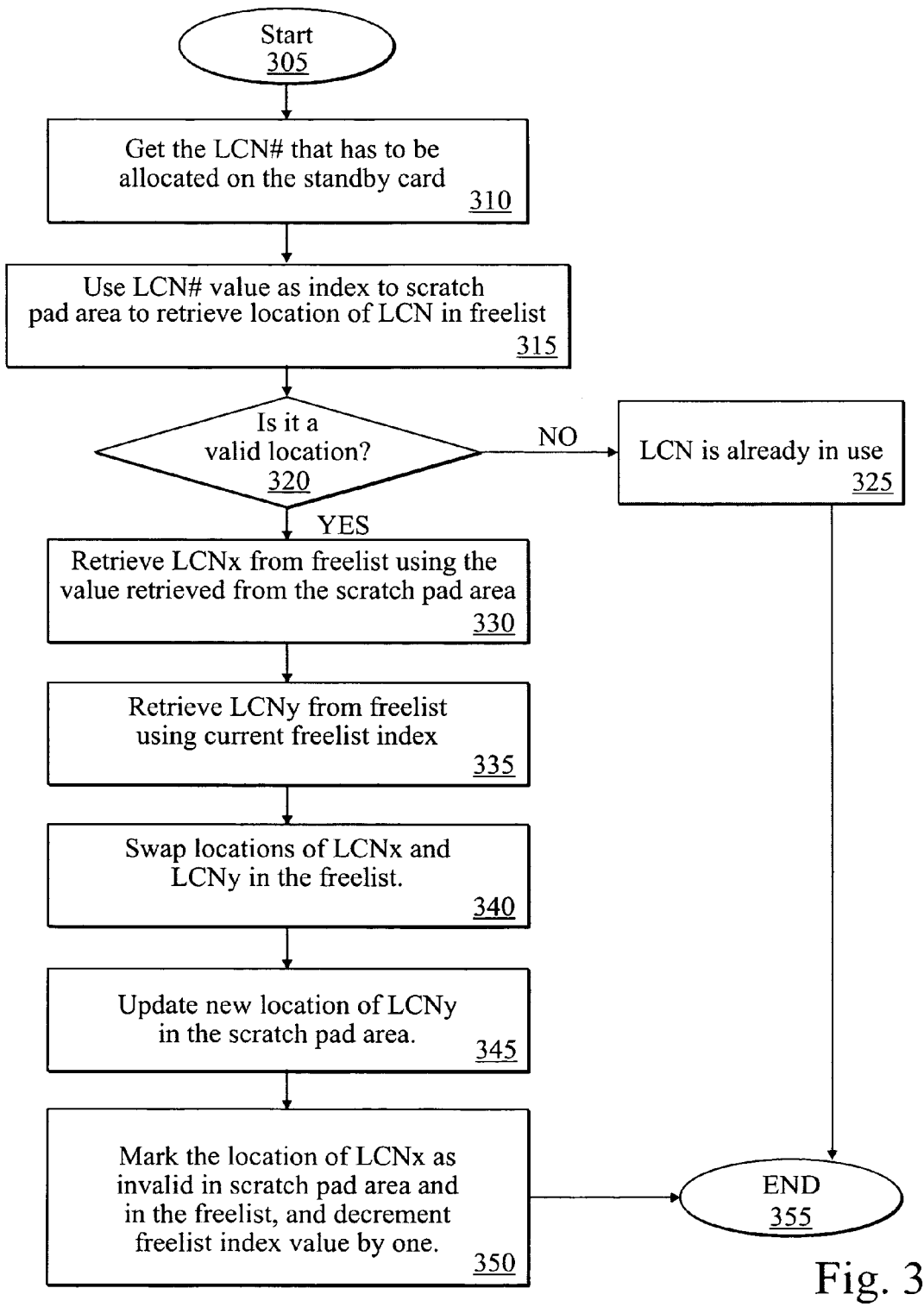
FIG. 3 is an exemplary flow diagram illustrating a process for handling an allocate LCN command in the standby card in one embodiment of the invention.

FIG. 3 is an exemplary flow diagram illustrating a process for handling an allocate LCN command in the standby card in one embodiment of the invention. The process starts at block 305. At bock 310, the LCN number associated with the add or allocate command is retrieved. This LCN number corresponds to an LCN from the freelist 205. This LCN from the freelist 205 is referred to herein as LCNx. At block 315, the LCN number is used as an index to a location in the scratch pad 210. The content of this location in the scratch pad 210 is used as a location of the LCNx in the freelist 205. For example, referring to FIG. 2, when the command is "ADD 1", LCNx is equal to 1. The content of the scratch pad location at index LCNx=1 is also 1. This is shown as scratch pad location 212.

At block 320, a determination is made to see if the LCN location retrieved from the scratch pad 210 is a valid location in the freelist 205. If it is not a valid location, then the LCN at that location is already in use and cannot be allocated, as shown in block 325. From block 325, the process ends at block 355.

However, from block 320, if the LCN location is a valid location in the freelist 205, the process moves to block 330 where the LCN is retrieved from the freelist 205 at the LCN location retrieved from the scratch pad 210. This LCN is referred to as LCNx. At block 335, the LCN content of the freelist location pointed to by the R_index 215 is retrieved. This LCN is referred to as LCNy. As discussed earlier, the r_index 215 is initially set to point to the last index or to the bottom of the freelist 205. At block 340, the location of LCNx and the location of LCNy in the freelist 205 are swappped. This basically moves the LCNy to a new location in the freelist 205 while still preserving its availability.

At block 345, the new location of LCNy in the freelist 205 is updated in the scratch pad 210. At block 350, the new LCN location of LCNx in the freelist 205 is marked as invalid to indicate that the LCNx has been allocated and is not available. Similarly, the location in the scratch pad 210 indexed by the LCN number associated with the allocate command is marked as invalid to indicate an invalid location. In addition, the r_index pointer 215 is decremented by one to by pass the invalid LCN location used to be occupied by LCNx. The process ends at block 355.

Figure 4:
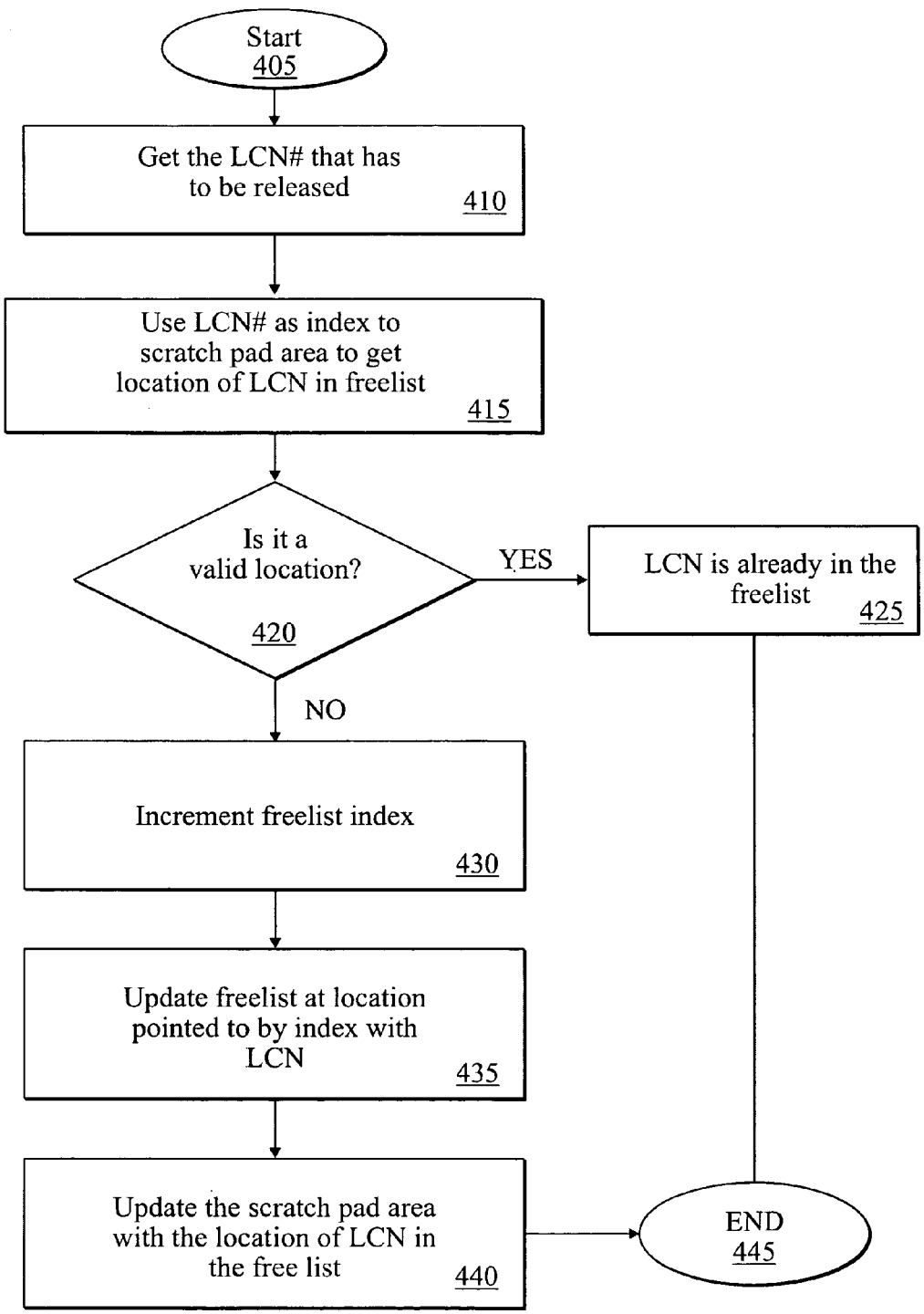
FIG. 4 is an exemplary flow diagram illustrating a process for handling a deallocate LCN command in the standby card in one embodiment of the invention.

FIG. 4 is an exemplary flow diagram illustrating a process for handling a deallocate LCN command in the standby card in one embodiment of the invention. The process starts at block 405. At block 410, the LCN number from the delete or deallocate command is received. At block 415, this LCN number is used as an index to a location in the scratch pad 210. For example, referring to FIG. 2, when the command is "Delete 5", the corresponding location in the scratch pad 210 is the location 213. The content of this location is used as an index to the location of the corresponding LCN in the freelist 205. This content is referred to as LCN location.

At block 420, a determination is made to see if the LCN location is a valid location. The LCN location is a valid location if its content is not marked invalid by a previous allocate LCN command. From block 420, if the LCN location is a valid location, the process moves to block 425. The valid LCN location indicates that the LCN is already in the freelist, as shown in block 425. From block 425, the process ends at block 445.

Going back to block 420, if the LCN location is not a valid location, the process moves to block 430 where the r_index pointer (freelist index) is incremented by one. This indicates that an additional LCN is available in the freelist 205. At block 435, the content of the new location pointed to by the r_index in the freelist 205 is updated with the LCN number. This releases the deallocated LCN back into the LCN pool or the freelist 205. At block 440, the scratch pad 210 is updated with the location of the LCN in the freelist 205. Using the above "Delete 5" example, the content of the location 213 of the scratch pad 210 (in FIG. 2) is updated with the current value of r_index 215.

FIGS. 5A–5H are exemplary block diagrams illustrating the freelist and the scratch pad using a sequence of exemplary add connection and delete connection commands. The exemplary sequence of add connection and delete connection commands received by the active card are listed as followed:

| Command number | Command type | LCN number |
|---|---|---|
| First | ADD | 1 |
| Second | ADD | 2 |
| Third | ADD | 5 |
| Fourth | ADD | 3 |
| Fifth | DELETE | 2 |
| Sixth | ADD | 4 |
| Seventh | DELETE | 3 |
| Eight | DELETE | 4 |

The freelist contains all the free LCNs. The scratch pad contains the locations of the free LCNs in the freelist. In this example, the initial values of the freelist and the scratch pad are those illustrated in FIG. 2 with the r_index having a value equal to the maximum number of LCNs (5) and pointing to the bottom location 224 of the freelist.

Figure 5A:
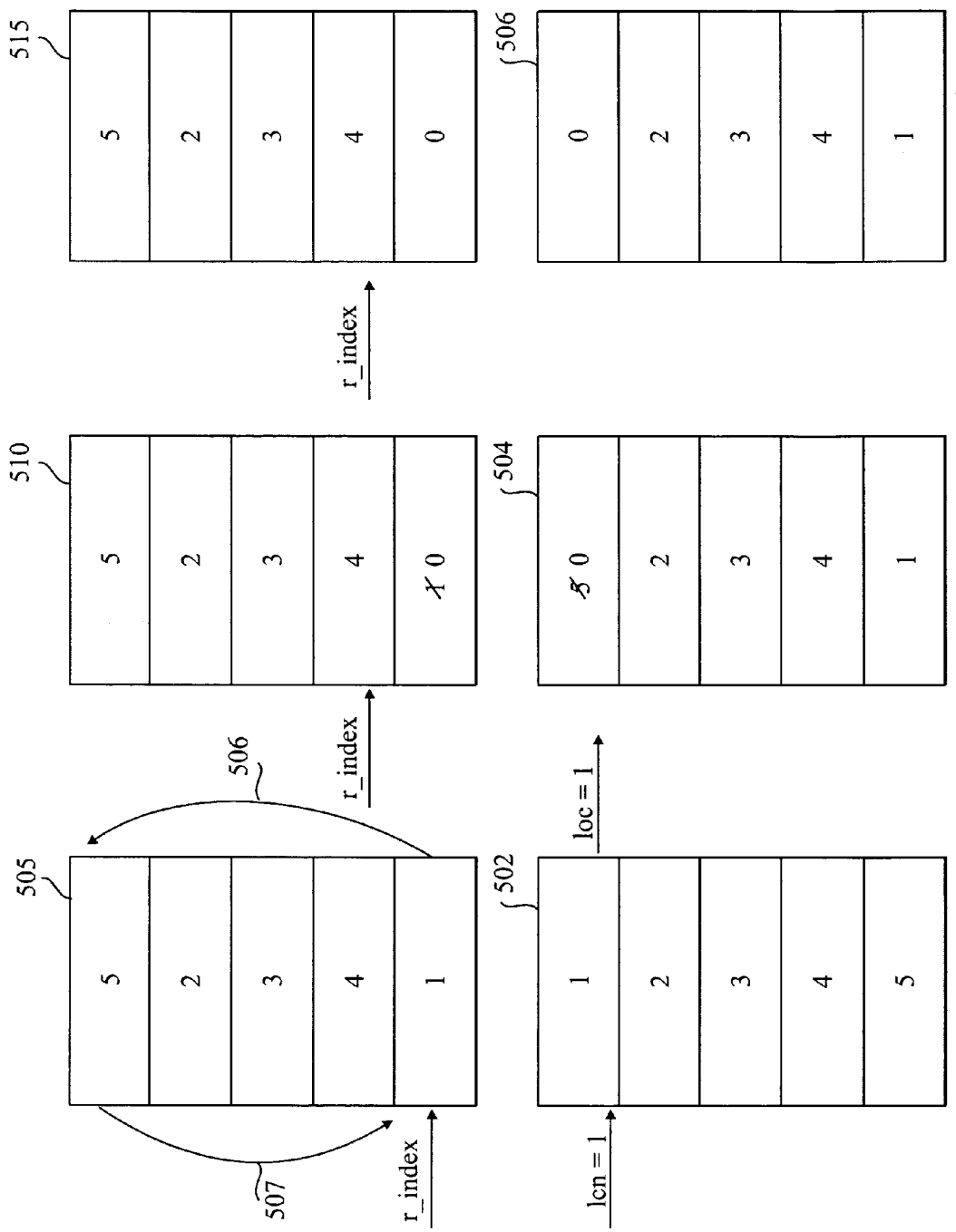

FIG. 5A illustrates the freelist and the scratch pad when the first exemplary command ("Add 1") is performed. The "Add 1" command means add a connection with LCN number 1. Using the process illustrated in FIG. 3, the LCN number (illustrated as "lcn=1") is used as an index to the scratch pad 502. The content of this indexed location is retrieved from the scratch pad 502. This content has a value of 1 and is illustrated as "loc=1". The number 1 in "loc=1" represents the location number of the LCN number 1 in the freelist 505. The location number is described above in FIG. 2. Using this location number 1, the content of the freelist at location number 1 is retrieved. From the initial values illustrated in FIG. 2, this content has a value of 1 and is referred to as LCNx. Using the current value of r_index as a location number, the content of the freelist at this location number is retrieved. This content has a value of 5 and is referred to as LCNy.

The LCNx and the LCNy values in the freelist are swapped. This is illustrated in the freelist 505 in FIG. 5A. The arrows 506 and 507 indicate the swapping of LCNx and LCNy. With the swap, LCNy is moved from location number 5 to location number 1, and LCNx is moved from location number 1 to location number 5. The freelist 510 illustrates the current LCN values after the swap. The swapped-to location of LCNx is the location pointed to by r_index. Since this LCN is now allocated and not free, the location is marked as invalid. In this example, the value "0" represents an invalid entry. As illustrated in the freelist 510, the location pointed to by r_index is set to zero, and the r_index is decremented by one to point to a next lower location (#2). Correspondingly, the scratch pad 504 is updated to reflect the new location of LCNy. For example, the location number 5 of the scratch pad 502 is updated to reflect the new location of the LCN 5, as shown in the scratch pad 504. In addition, the location number 1 of the scratch pad 502 is updated to show an invalid entry to reflect the allocation of the LCN 1, as shown in the scratch pad 504. The freelist 515 and the scratch pad 506 illustrate the current values after completion of the first command.

Figure 5B:
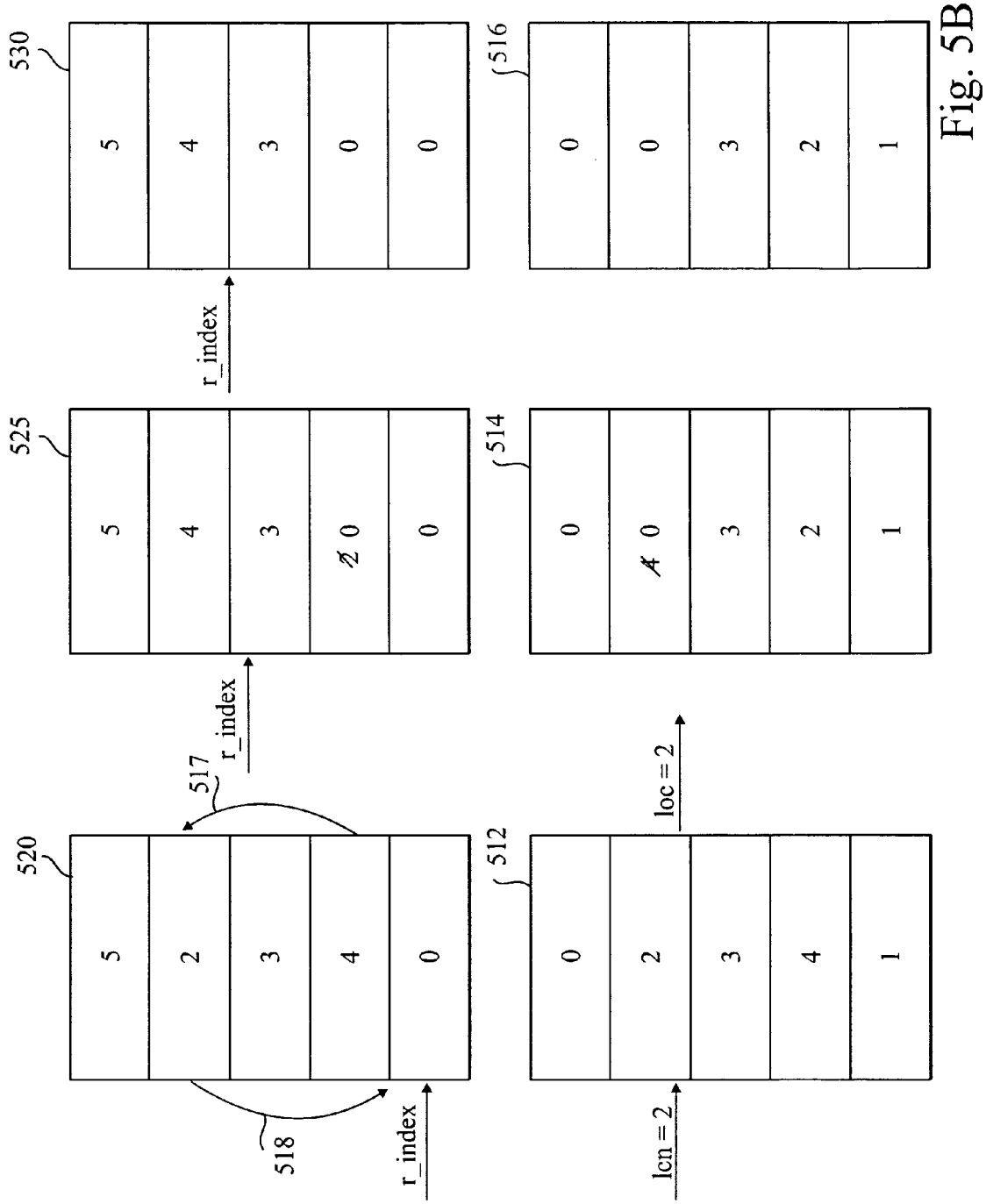

FIG. 5B illustrates the freelist and the scratch pad when the second exemplary command ("Add 2") is performed. The "Add 2" command means add a connection with LCN number 2. The LCN number (illustrated as "lcn=2") is used as an index to the scratch pad 512. The content of this indexed location is retrieved from the scratch pad 512. This content has a value of 2 and is illustrated as "loc=2". Using this location number 2, the content of the freelist at location number 2 is retrieved. This content has a value of 2 and is referred to as LCNx. The content of the freelist at the current location pointed to by r_index has a value of 4. This is referred to as LCNy. The LCNx and the LCNy values in the freelist 520 are swapped, as illustrated by the arrows 517 and 518. With the swap, LCNy is moved from location number 4 to location number 2, and LCNx is moved from location number 2 to location number 4. The freelist 525 illustrates the current LCN values after the swap. The swapped-to location of LCNx is the location pointed to by r_index. Since this LCN is now allocated and not free, the location number 4 in the freelist 525 is marked as invalid ("0"). The r_index is decremented by one to point to a next lower location (#3). Correspondingly, the scratch pad 512 is updated to reflect the new location of LCNy. For example, the location number 4 of the scratch pad 512 is updated to reflect the new location of the LCN 4, as shown in the scratch pad 514. In addition, the location number 2 of the scratch pad 512 is updated to show an invalid entry to reflect the allocation of the LCN 2, as shown in the scratch pad 514. The freelist 530 and the scratch pad 516 illustrate the current values after completion of the second command.

FIG. 5C illustrates the freelist and the scratch pad when the third exemplary command ("Add 5") is performed. The "Add 5" command means add a connection with LCN number 5. The LCN number (illustrated as "lcn=5") is used as an index to the scratch pad 522. The content of this indexed location is retrieved from the scratch pad 522. This content has a value of 1 and is illustrated as "loc=1". Using this location number 1, the content of the freelist 535 at location number 1 is retrieved. This content has a value of 5 and is referred to as LCNx. The content of the freelist at the current location pointed to by r_index has a value of 3. This is referred to as LCNy. The LCNx and the LCNy values in the freelist 535 are swapped, as illustrated by the arrows 527 and 528. With the swap, LCNy is moved from location number 3 to location number 1, and LCNx is moved from location number 1 to location number 3. The freelist 540 illustrates the current LCN values after the swap. The swapped-to location of LCNx is the location pointed to by r_index. Since this LCN is now allocated and not free, the location number 3 in the freelist 540 is marked as invalid ("0"). The r_index is decremented by one to point to a next lower location (#2). Correspondingly, the scratch pad 522 is updated to reflect the new location of LCNy. For example, the location number 3 of the scratch pad 522 is updated to reflect the new location of the LCN 3, as shown in the scratch pad 524. In addition, the location number 5 of the scratch pad 522 is updated to show an invalid entry to reflect the allocation of the LCN 5, as shown in the scratch pad 524. The freelist 545 and the scratch pad 526 illustrate the current values after completion of the third command.

Figure 5D:
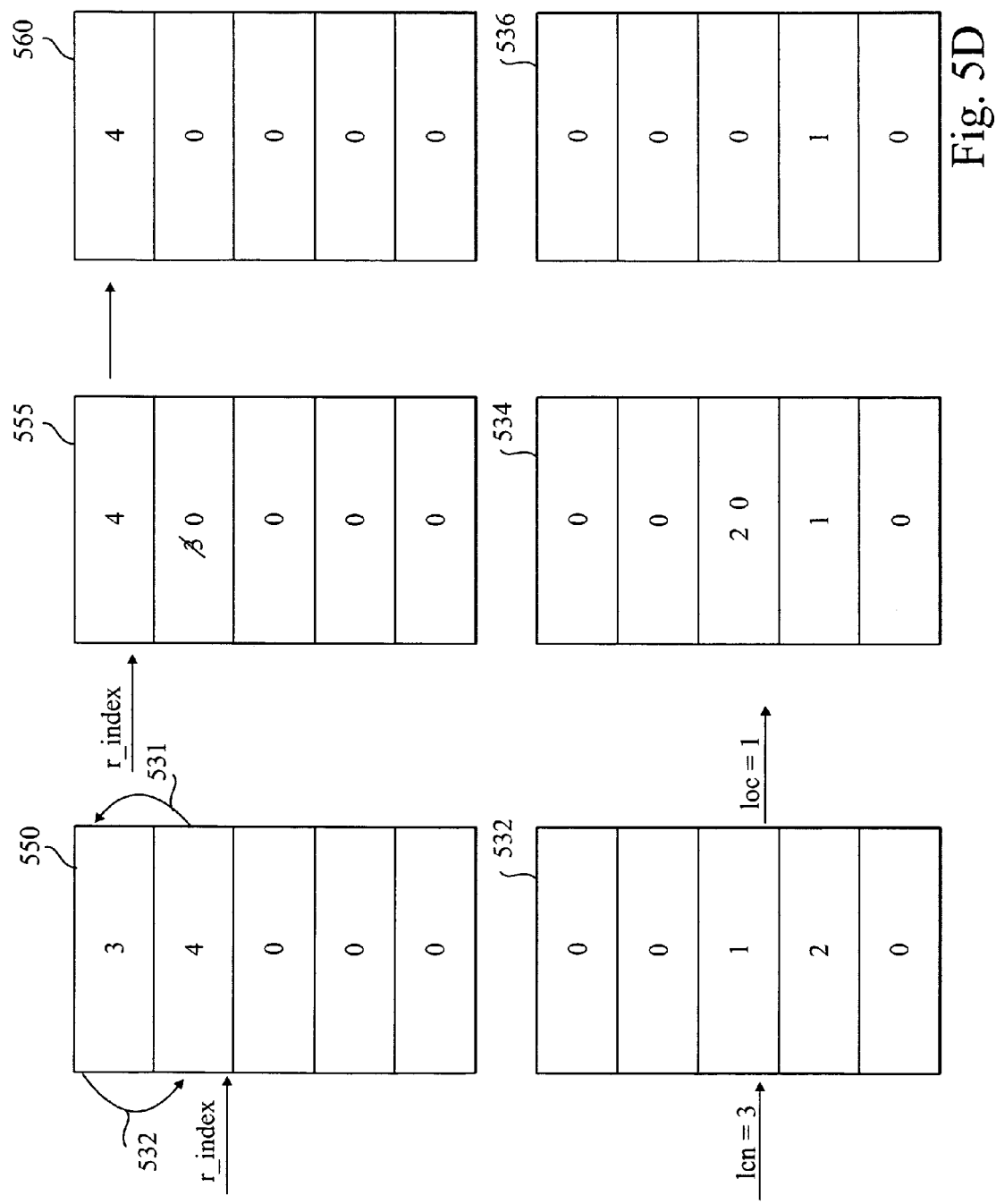

FIG. 5D illustrates the freelist and the scratch pad when the fourth exemplary command ("Add 3") is performed. The "Add 3" command means add a connection with LCN number 3. The LCN number (illustrated as "lcn=3") is used as an index to the scratch pad 532. The content of this indexed location is retrieved from the scratch pad 532. This content has a value of 1 and is illustrated as "loc=1". Using this location number 1, the content of the freelist 550 at location number 1 is retrieved. This content has a value of 3 and is referred to as LCNx. The content of the freelist at the current location pointed to by r_index has a value of 4. This is referred to as LCNy. The LCNx and the LCNy values in the freelist 550 are swapped, as illustrated by the arrows 531 and 532. With the swap, LCNy is moved from location number 2 to location number 1, and LCNx is moved from location number 1 to location number 2. The freelist 555 illustrates the current LCN values after the swap. The swapped-to location of LCNx is the location pointed to by r_index. Since this LCN is now allocated and not free, the location number 2 in the freelist 555 is marked as invalid ("0"). The r_index is decremented by one to point to a next lower location (#1). Correspondingly, the scratch pad 532 is updated to reflect the new location of LCNy. For example, the location number 4 of the scratch pad 532 is updated to reflect the new location of the LCN 4, as shown in the scratch pad 534. In addition, the location number 3 of the scratch pad 532 is updated to show an invalid entry to reflect the allocation of the LCN 3, as shown in the scratch pad 534. The freelist 560 and the scratch pad 536 illustrate the current values after completion of the fourth command.

Figure 5E:
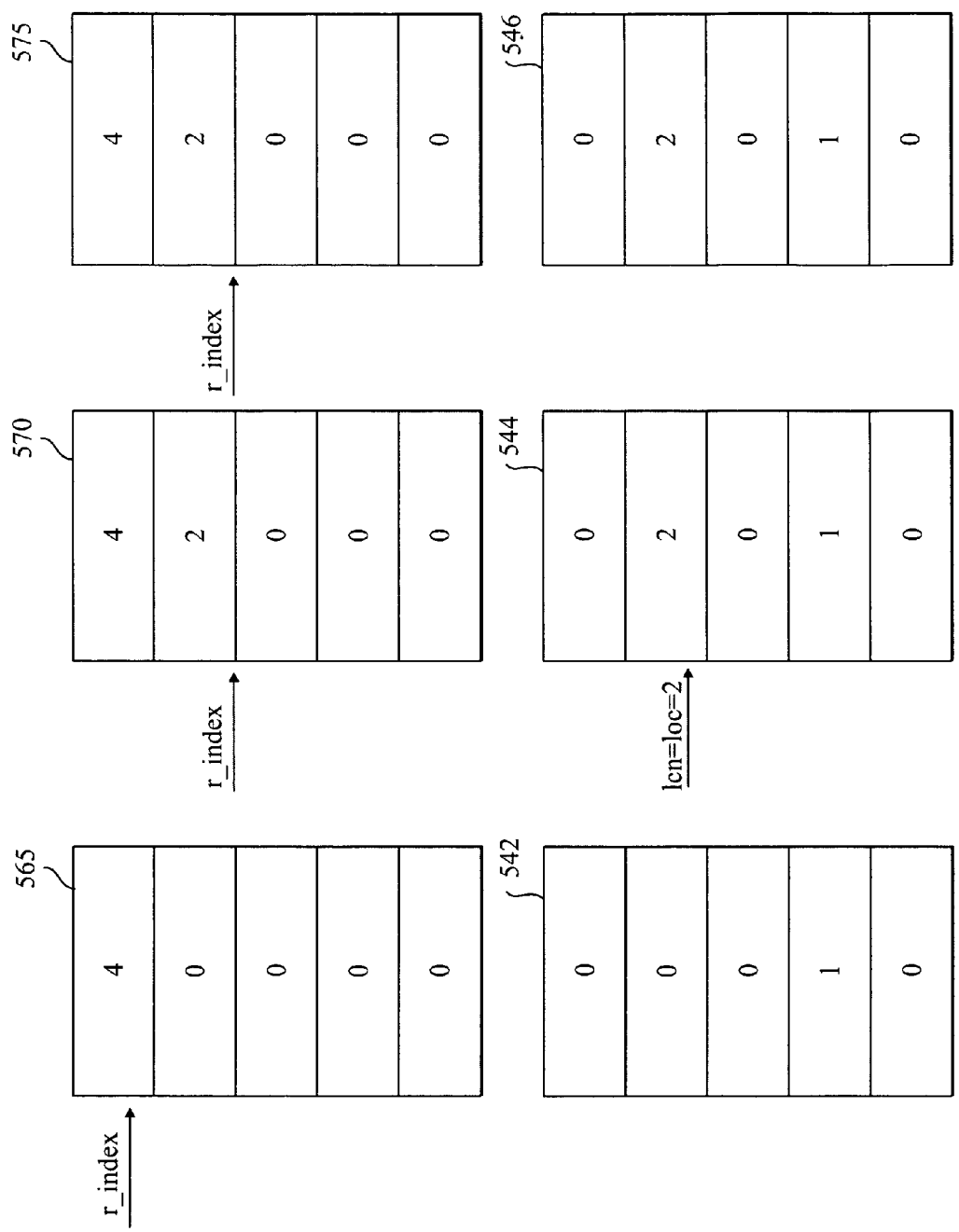

FIG. 5E illustrates the freelist and the scratch pad when the fifth exemplary command ("Del 2") is performed. The "Del 2" command means delete a connection with LCN number 2. The r_index is currently pointing to location number 1 of the freelist 565. The r_index is incremented by one to point to a next location (#2), as illustrated in the freelist 570. In addition, the content of the freelist location #2 is updated with the LCN value ("2") from the delete command. Correspondingly, the scratch pad 542 is updated to reflect the location of LCN 2. The LCN number is used as the location number for the scratch pad 542. Thus, the content of the location number 2 of the scratch pad 542 is updated to reflect the location of the LCN 2, as illustrated in the scratch pad 544. The freelist 575 and the scratch pad 546 illustrate the current values after completion of the fifth command.

Figure 5F:
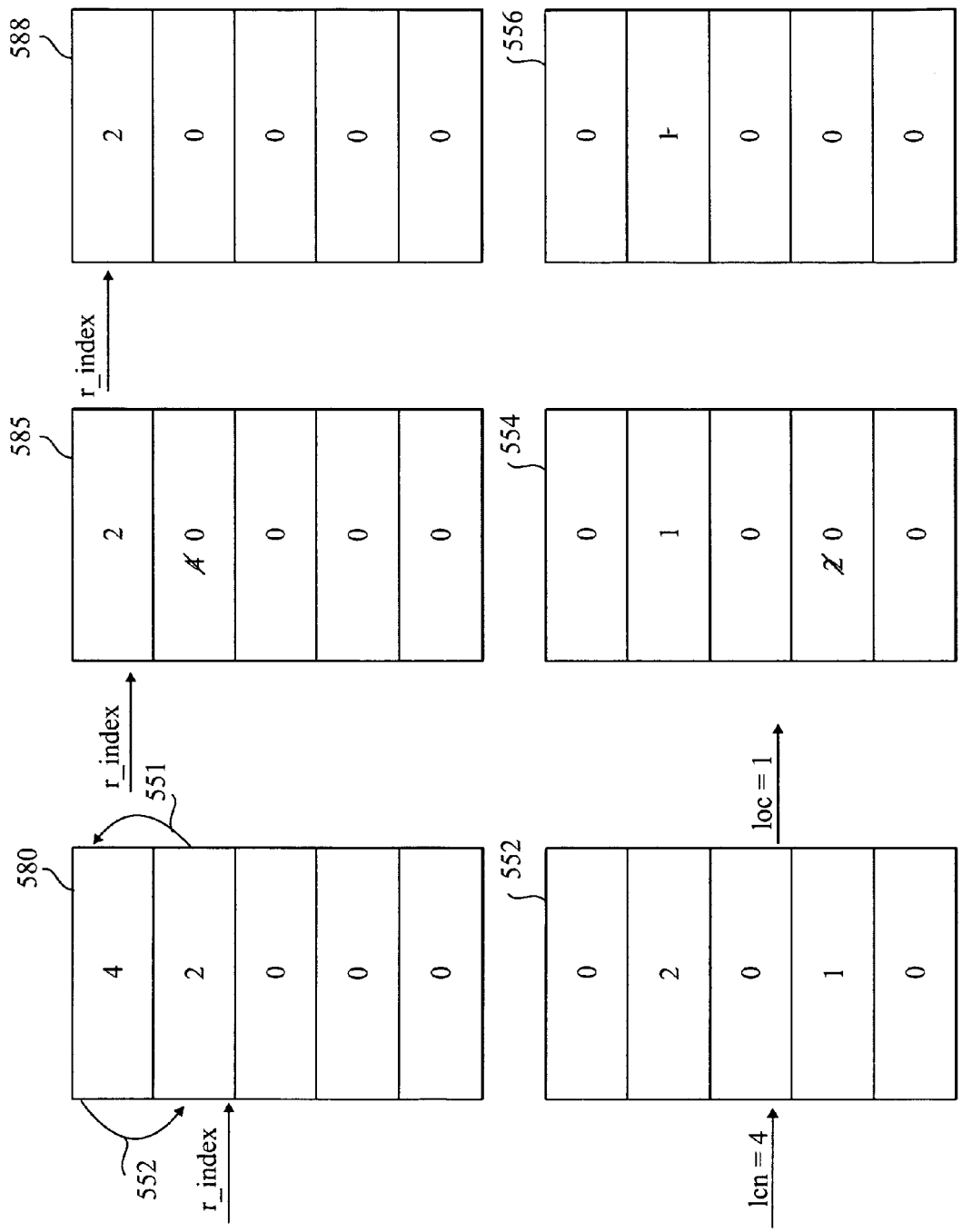

FIG. 5F illustrates the freelist and the scratch pad when the sixth exemplary command ("Add 4") is performed. The "Add 4" command means add a connection with LCN number 4. The LCN number (illustrated as "lcn=4") is used as an index to the scratch pad 552. The content of this indexed location is retrieved from the scratch pad 552. This content has a value of 1 and is illustrated as "loc=1". Using this location number 1, the content of the freelist 580 at location number 1 is retrieved. This content has a value of 4 and is referred to as LCNx. The content of the freelist 580 at the location currently pointed to by r_index has a value of 2. This is referred to as LCNy. The LCNx and the LCNy values in the freelist 580 are swapped, as illustrated by the arrows 551 and 552. With the swap, LCNy is moved from location number 2 to location number 1, and LCNx is moved from location number 1 to location number 2. The freelist 585 illustrates the current LCN values after the swap. The swapped-to location of LCNx is the location pointed to by r_index. Since this LCN is now allocated and not free, the location number 2 in the freelist 585 is marked as invalid ("0"). The r_index is decremented by one to point to a next lower location (#1). Correspondingly, the scratch pad 552 is updated to reflect the new location of LCNy. For example, the location number 2 of the scratch pad 552 is updated to reflect the new location of the LCN 2, as shown in the scratch pad 554. In addition, the location number 4 of the scratch pad 552 is updated to show an invalid entry to reflect the allocation of the LCN 4, as shown in the scratch pad 554. The freelist 588 and the scratch pad 556 illustrate the current values after completion of the sixth command.

Figure 5G:
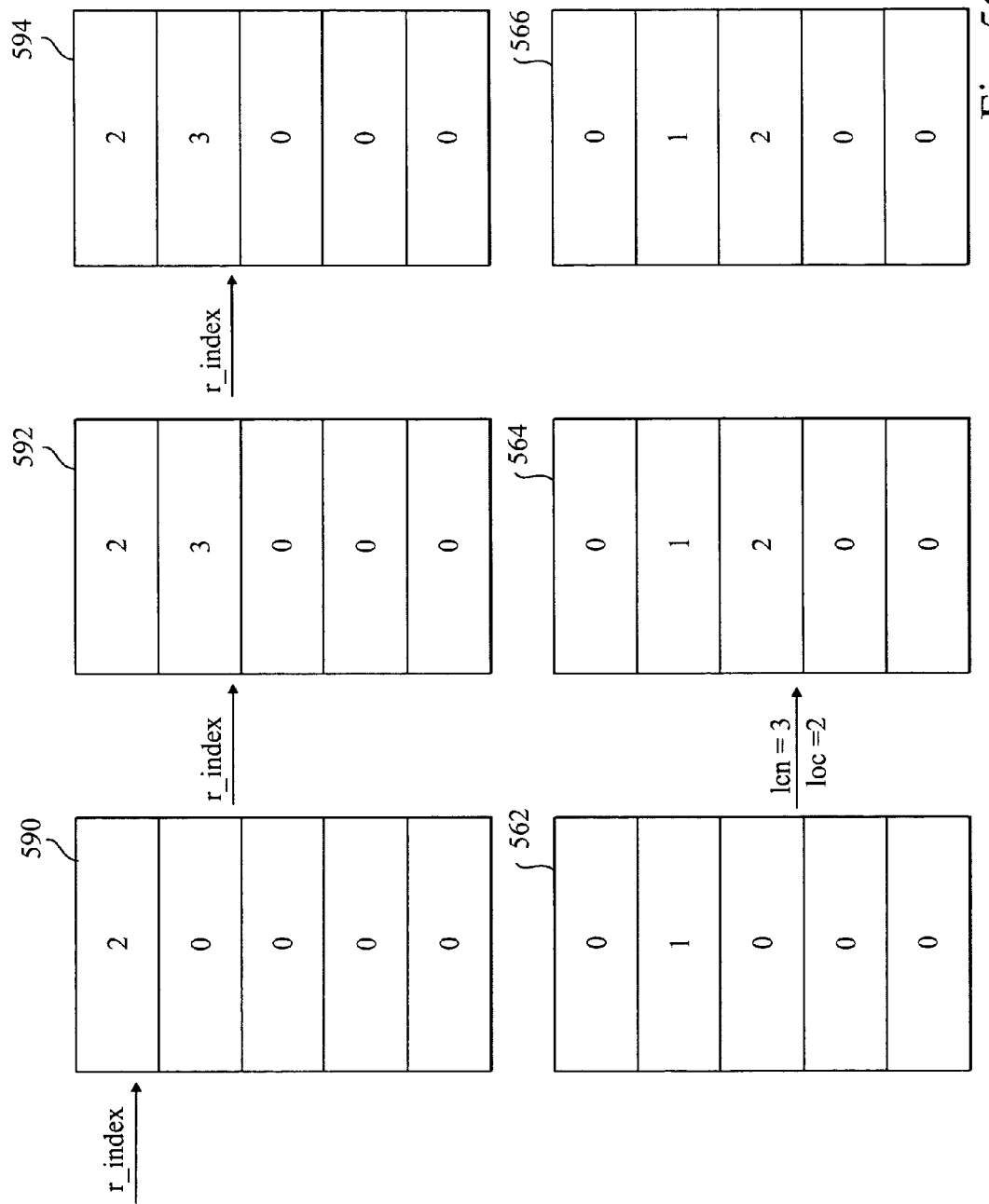

FIG. 5G illustrates the freelist and the scratch pad when the seventh exemplary command ("Del 3") is performed. The "Del 3" command means delete a connection with LCN number 3. The r_index is currently pointing to location number 1 of the freelist 590. The r_index is incremented by one to point to a next location (#2), as illustrated in the freelist 592. In addition, the content of the freelist location #2 is updated with the LCN value ("3") from the delete command. Correspondingly, the scratch pad 562 is updated to reflect the location of LCN 3. The LCN number is used as the location number for the scratch pad 562. Thus, the content of the location number 3 of the scratch pad 562 is updated to reflect the location of the LCN 3, as illustrated in the scratch pad 564. LCN 3 is at the location number 2 in the freelist 592. The freelist 594 and the scratch pad 566 illustrate the current values after completion of the seventh command.

Figure 5H:
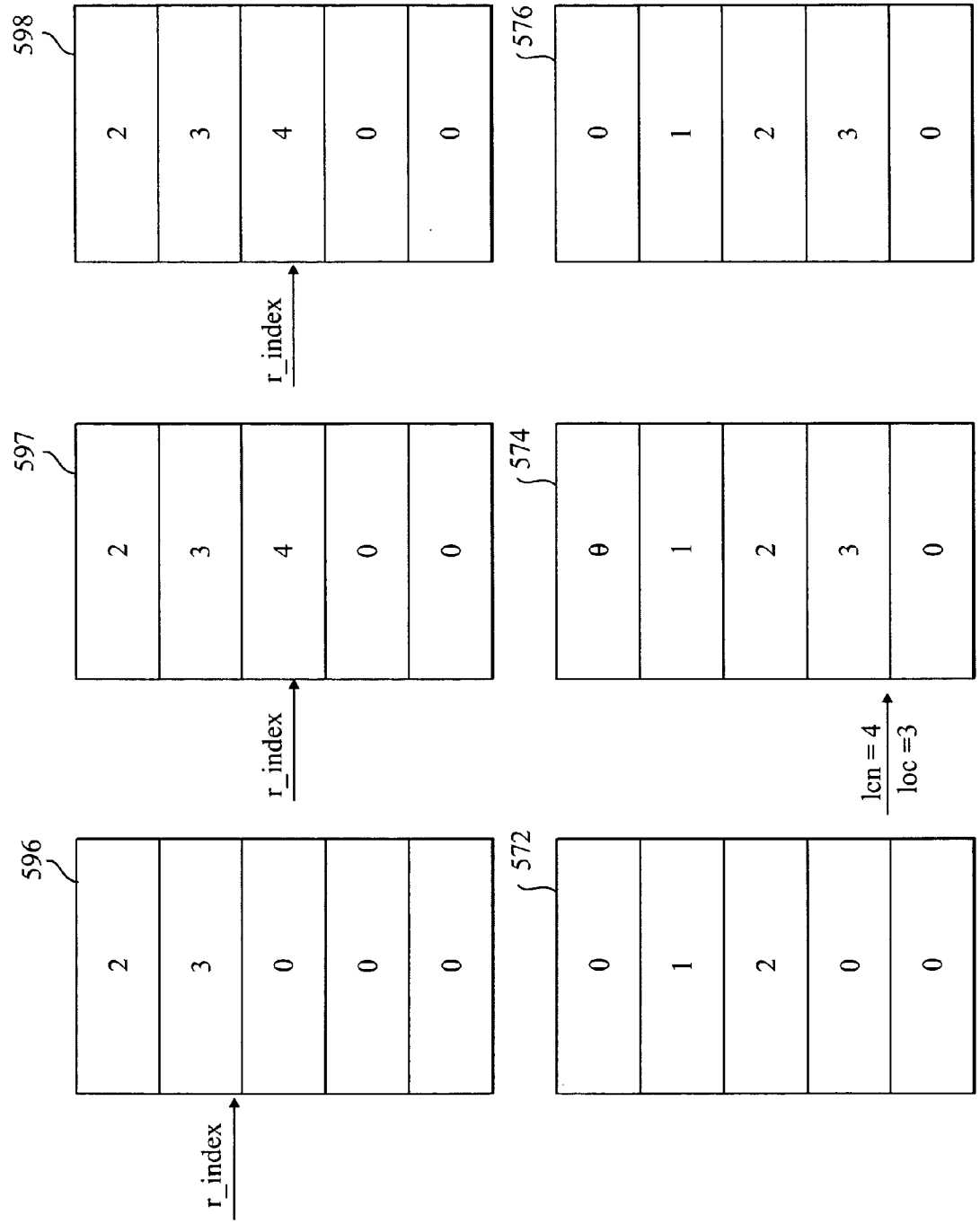

FIG. 5H illustrates the freelist and the scratch pad when the eighth exemplary command ("Del 4") is performed. The "Del 4" command means delete a connection with LCN number 4. The r_index is currently pointing to location number 2 of the freelist 596. The r_index is incremented by one to point to a next location (#3), as illustrated in the freelist 597. In addition, the content of the freelist location number 3 is updated with the LCN value ("4") from the delete command. Correspondingly, the scratch pad 572 is updated to reflect the location of LCN 4. The LCN number is used as the location number for the scratch pad 572. Thus, the content of the location number 4 of the scratch pad 572 is updated to reflect the location of the LCN 4, as illustrated in the scratch pad 574. The freelist 598 and the scratch pad 576 illustrate the current values after completion of the eighth command.

Using the method of the present invention, the above exemplary sequence of commands are performed by the standby card as each command is tranferred to the standby card from the active card. As illustrated in FIGS. 5A–5H, the method of the present invention allows the LCN database to be in compacted form after completion of each command. This reduces the LCN database compaction delay to zero when the standby card changes its role from the standby role to the active role.

The method described above can be stored in the memory of a computer system as a set of instructions (i.e., software). The set of instructions may reside, completely or at least partially, within the main memory and/or within the processor to be executed. In addition, the set of instructions to perform the methods described above could alternatively be stored on other forms of machine-readable media. For the purposes of this specification, the term "machine-readable media" shall be taken to include any media which is capable of storing or embodying a sequence of instructions for execution by the machine and that cause the machine to perform any one of the methodologies of the present invention. The term "machine readable media" shall accordingly be taken to include, but not limited to, optical and magnetic disks.

Alternatively, the logic to perform the methods as discussed above, could be implemented in additional computer and/or machine readable media, such as, for example, discrete hardware components as large-scale integrated circuits (LSI's), application-specific integrated circuits (ASIC's), firmware such as electrically erasable programmable read-only memory (EEPROM's), and electrical, optical, acoustical and other forms of propagated signals (e.g., carrier waves, infrared signals, digital signals, etc.), etc.

From the above description and drawings, it will be understood by those of ordinary skill in the art that the particular embodiments shown and described are for purposes of illustration only and are not intended to limit the scope of the invention. Those of ordinary skill in the art will recognize that the invention may be embodied in other specific forms without departing from its spirit or essential characteristics. References to details of particular embodiments are not intended to limit the scope of the claims.

What is claimed is:

1. A method, comprising:
   receiving a logical connection number (LCN) associated with a first logical connection from a connection command;
   using the LCN as a first index to a location in a first memory area to retrieve a second index to a location in a second memory area; and
   using the second index to access the first logical connection from the location in the second memory area, wherein the location in the first memory area is associated with an availability indicator, the availability indicator being on when the first logical connection is available in the second memory area, the availability being off when the first logical connection is unavailable in the second memory area.

2. The method of claim 1, wherein when the connection command is an allocate command and the availability indicator is on, the first logical connection is allocated from the location in the second memory area.

3. The method of claim 2, wherein when the connection command is a deallocate command and the availability indicator is off, the first logical connection is deallocated to the location in the second memory area.

4. The method of claim 3, wherein the second memory area comprises an array of available logical connections, each array entry associated with a LCN of an available logical connection, wherein a third index is used to access a second logical connection at a bottom location of the array.

5. The method of claim 4, wherein when the first logical connection associated with the connection command is available and when the connection command is the allocate command, the second logical connection accessed by the third index is swapped with the first logical connection accessed by the second index such that the third index is used to access the first logical connection, wherein the first memory area is updated to reflect change in location of the second logical connection.

6. The method of claim 5, wherein after the first logical connection is accessed the third index is decremented to allow access to a new bottom location of the array.

7. The method of claim 4, wherein when the first logical connection associated with the connection command is unavailable and when the connection command is the deallocate command, the third index is incremented by one to be used to access a new bottom location of the array, wherein the first logical connection from the deallocate command is returned to the array at the new bottom location of the array.

8. The method of claim 7, wherein the availability associated with the first logical connection is set to on, and wherein the second index is updated to allow access to the first logical connection.

9. A computer readable medium having stored thereon sequences of instructions which are executable by a digital processing system and which, when executed by the digital processing system, cause the system to perform a method, comprising:
   receiving a logical connection number (LCN) associated with a first logical connection from a connection command;
   using the LCN as a first index to a location in a first memory area to retrieve a second index to a location in a second memory area; and
   using the second index to access the first logical connection from the location in the second memory area, wherein the location in the first memory area is associated with an availability indicator, the availability indicator being on when the first logical connection is available in the second memory area, the availability being off when the first logical connection is unavailable in the second memory area.

10. The computer readable medium of claim 9, wherein when the connection command is an allocate command and the availability indicator is on, the first logical connection is allocated from the location in the second memory area.

11. The computer readable medium of claim 10, wherein when the connection command is a deallocate command and the availability indicator is off, the first logical connection is deallocated to the location in the second memory area.

12. The computer readable medium of claim 11, wherein the second memory area comprises an array of available logical connections, each array entry associated with a LCN of an available logical connection, wherein a third index is used to access a second logical connection at a bottom location of the array.

13. The computer readable medium of claim 12, wherein when the first logical connection associated with the connection command is available and when the connection command is the allocate command, the second logical connection accessed by the third index is swapped with the first logical connection accessed by the second index such that the third index is used to access the first logical connection, wherein the first memory area is updated to reflect change in location of the second logical connection.

14. The computer readable medium of claim 13, wherein after the first logical connection is accessed the third index is decremented to allow access to a new bottom location of the array.

15. The computer readable medium of claim 12, wherein when the first logical connection associated with the connection command is unavailable and when the connection command is the deallocate command, the third index is incremented by one to be used to access a new bottom location of the array, wherein the first logical connection from the deallocate command is returned to the array at the new bottom location of the array.

16. The computer readable medium of claim 15, wherein the availability associated with the first logical connection is set to on, and wherein the second index is updated to allow access to the first logical connection.

17. A system comprising:
a standby card to receive a connection command from an active card, the connection command associated with a logical connection number (LCN) of a first logical connection, the standby card processing the connection command on the standby card, said processing comprises:
using the LCN as a first index to a location in a first memory area to retrieve a second index to a location in a second memory area; and
using the second index to access the first logical connection from the location in the second memory area, wherein the location in the first memory area is associated with an availability indicator, the availability indicator being on when the first logical connection is available in the second memory area, the availability being off when the first logical connection is unavailable in the second memory area.

18. The system of claim 17, wherein when the connection command is an allocate command and the availability indicator is on, the first logical connection is allocated from the location in the second memory area.

19. The system of claim 18, wherein when the connection command is a deallocate command and the availability indicator is off, the first logical connection is deallocated to the location in the second memory area.

20. The system of claim 19, wherein the second memory area comprises an array of available logical connections, each array entry associated with a LCN of an available logical connection, wherein a third index is used to access a second logical connection at a bottom location of the array.

21. The system of claim 20, wherein when the first logical connection associated with the connection command is available and when the connection command is the allocate command, the second logical connection accessed by the third index is swapped with the first logical connection accessed by the second index such that the third index is used to access the first logical connection, wherein the first memory area is updated to reflect change in location of the second logical connection.

22. The system of claim 21, wherein after the first logical connection is accessed the third index is decremented to allow access to a new bottom location of the array.

23. The system of claim 20, wherein when the first logical connection associated with the connection command is unavailable and when the connection command is the deallocate command, the third index is incremented by one to be used to access a new bottom location of the array, wherein the first logical connection from the deallocate command is returned to the array at the new bottom location of the array.

24. The system of claim 23, wherein the availability associated with the first logical connection is set to on, and wherein the second index is updated to allow access to the first logical connection.

25. A system, comprising:
means for receiving a connection command from an active card, the connection command associated with a logical connection number (LCN) of a first logical connection; and
means for processing the connection command comprising:
means for using the LCN as a first index to a location in a first memory area to retrieve a second index to a location in a second memory area; and
means for using the second index to access the first logical connection from the location in the second memory area, wherein the location in the first memory area is associated with an availability indicator, the availability indicator being on when the first logical connection is available in the second memory area, the availability being off when the first logical connection is unavailable in the second memory area.

26. The system of claim 25, wherein when the connection command is an allocate command and the availability indicator is on, the first logical connection is allocated from the location in the second memory area.

27. The system of claim 26, wherein when the connection command is a deallocate command and the availability indicator is off, the first logical connection is deallocated to the location in the second memory area.

28. The system of claim 27, wherein the second memory area comprises an array of available logical connections, each array entry associated with a LCN of an available logical connection, wherein a third index is used to access a second logical connection at a bottom location of the array.

29. The system of claim 28, wherein when the first logical connection associated with the connection command is available and when the connection command is the allocate command, the second logical connection accessed by the third index is swapped with the first logical connection accessed by the second index such that the third index is used to access the first logical connection, wherein the first memory area is updated to reflect change in location of the second logical connection.

30. The system of claim 29, wherein after the first logical connection is accessed the third index is decremented to allow access to a new bottom location of the array.

31. The system of claim 28, wherein when the first logical connection associated with the connection command is unavailable and when the connection command is the deallocate command, the third index is incremented by one to be used to access a new bottom location of the array, wherein the first logical connection from the deallocate command is returned to the array at the new bottom location of the array.

32. The system of claim 31, wherein the availability associated with the first logical connection is set to on, and wherein the second index is updated to allow access to the first logical connection.

* * * * *